(12) United States Patent
Nakamura et al.

(10) Patent No.: US 6,505,866 B1
(45) Date of Patent: Jan. 14, 2003

(54) PIPE JOINT

(75) Inventors: Yoshitaka Nakamura, Tokyo (JP); Akihiro Tanaka, Tokyo (JP); Tsutomu Uno, Tokyo (JP); Osamu Igarashi, Kanagawa (JP); Noriyoshi Komiyama, Kanagawa (JP); Mitsuru Hirai, Kanagawa (JP)

(73) Assignees: Tokyo Gas Co., Ltd., Tokyo (JP); Nikko Kogyo Kabushiki Kaisha, Kanagawa (JP)

( * ) Notice: Subject to any disclaimer, the term of this patent is extended or adjusted under 35 U.S.C. 154(b) by 0 days.

(21) Appl. No.: 09/633,852

(22) Filed: Aug. 7, 2000

(51) Int. Cl.$^7$ ................................................ F16L 25/00
(52) U.S. Cl. ...................................... 285/423; 285/239
(58) Field of Search .............................. 285/423, 239, 285/238

(56) References Cited

U.S. PATENT DOCUMENTS

| | | | | |
|---|---|---|---|---|
| 3,961,814 A | * | 6/1976 | Byrne et al. | 285/423 X |
| 4,275,908 A | * | 6/1981 | Elkins et al. | 285/423 X |
| 4,852,563 A | * | 8/1989 | Gross | 128/202.27 |
| 4,969,879 A | * | 11/1990 | Lichte | 604/283 |
| 5,186,500 A | * | 2/1993 | Folkers | 285/423 X |
| 5,330,235 A | * | 7/1994 | Wagner et al. | 285/423 X |
| 5,366,257 A | * | 11/1994 | McPherson | 285/423 X |
| 5,406,983 A | * | 4/1995 | Chambers et al. | 285/292 |
| 5,584,513 A | * | 12/1996 | Sweeny et al. | 285/323 |
| 5,864,938 A | * | 2/1999 | Gansel et al. | 29/506 |
| 6,138,715 A | * | 10/2000 | LaLone et al. | 137/797 |
| 6,241,840 B1 | * | 6/2001 | Pratt et al. | 156/172 |

FOREIGN PATENT DOCUMENTS

| | | | | |
|---|---|---|---|---|
| GB | 2077377 | * | 12/1981 | 285/423 X |
| JP | 11210967 | * | 8/1999 | 285/423 X |

* cited by examiner

*Primary Examiner*—Lynne H. Browne
*Assistant Examiner*—David E. Bochna
(74) *Attorney, Agent, or Firm*—Nixon Peabody LLP; Thomas W. Cole

(57) ABSTRACT

Provided is a highly reliable leak-proof pipe joint which is superior in workability, inexpensive and Light, superior in resistance against chlorine and oxygen contained in hot water or vapor, resistive against hydrolysis in hot water, superior in mechanical strength and impact resistance, and thereby capable of withstanding deformation due to water pressure or water hammer phenomenon. This pipe, joint has a main body and a connector or connecting the main body to a pipe, wherein at least either the main body or connector is formed from one type selected from a group consisting or resin in which thermoplastic elastomer is added to polyphenylene sulfide, polysulfone, polyphenyl sulfane, polyphthalimide and polyetherimide, and the main body and connector are formed integrally.

14 Claims, 5 Drawing Sheets

PIPE JOINT

BACKGROUND OF THE INVENTION

1. Field of the Invention

The present invention generally relates to a pipe joint, and particularly to a pipe joint for connecting pipes through which the likes of hot water, antifreeze, liquid heat medium or vapor passes.

2. Description of the Related Art

As an example of a conventional pipe joint for connecting pipes typified by those of heaters and calorifiers, through which the likes of hot water, antifreeze, liquid heat medium or vapor passes, there is a pipe joint comprising a joint body, tube-side connector formed on one end of this joint body to be connected to a pipe tube, and header-side connector formed on the other end of the joint body to be connected to the header; i.e., a pipe assembly joint.

This type of pipe joint is expected to satisfy five conditions; namely, that it has (1) chemical resistance against residual chlorine contained in the service water, (2) resistance against oxidization/deterioration due to oxygen dissolving in high-temperature service water, (3) resistance against hydrolysis in hot water, (4) mechanical strength that does not deform at a water pressure of 7 kg/cm$^2$ (10~15 kg), and (5) impact resistance capable of withstanding the water hammer phenomenon. Thus, in this type of pipe joint, the joint body, tube-side connector and header-side connector are formed from metals such as brass or copper. Moreover, the joint body and tube-side connector, and, the joint body and header-side connector are integrally formed by brazing, respectively, in order to satisfy the aforementioned conditions.

This pipe joint, however, has shortcomings of becoming expensive and heavy as it is manufactured by processing metals. Further, as there is no degree of freedom upon designing the shape of the pipe joint, it is necessary to add a separate component with secondary processing when providing additional functions thereto. This further increases the manufacturing cost. There is also a possibility that hot water or vapor would leak from the brazed portion of the pipe joint. Particularly, it the pipe is made of resin, the deterioration of the resin is accelerated by the contact between the metal and resin.

In addition, for example, the pipe joint and header are fastened with a separate component such as a fastening clip. This results in work inefficiency and increased costs due to separate components being required. It is also possible that a user will lose such components. Moreover, upon connecting a pipe tube to the pipe joint, a dedicated jig is used. Here, it is necessary to provide a flange to the pipe joint in order to determine the position of such jig and secure the pipe tube. This flange, however, is formed either by carving a pole having a large diameter or by attaching an E ring or C ring to the pipe joint, and there is a problem of much time and labor being required and of increased manufacturing costs.

Thereby, considered was forming the pipe joint from resin, which is inexpensive, easy to process, and light.

As the aforementioned resin, for example, used may be polyacetal, polyamide, polyphenylene sulfide, and so on. Nevertheless, the maximum temperature in which polyacetal can exhibit chemical resistance against residual chlorine contained in the service water is 60° C., and there is a shortcoming in that it may not be used for hot water or steam exceeding 80° C. Further, polyamide has shortcomings of dimensional change due to water absorption, decrease in mechanical strength, generation of hydrolysis or oxidization/deterioration with hot water of 80~90° C. Moreover, although polyphenylene sulfide has superior chemical resistance, it lacks the impact resistance capable of withstanding the water hammer phenomenon. In addition, it also has a shortcoming in that a structural design utilizing elastic flexure in order to realize a snap fit is not possible. As described above, currently, there is a problem in that a resin fulfilling the aforementioned five conditions does not exist.

SUMMARY OF THE INVENTION

The present invention was devised in view of the foregoing conventional problems, and an abject thereof is to provide a highly reliable leak-proof pipe joint which is superior in workability, inexpensive and light, superior in resistance against chlorine and oxygen contained in hot water or vapor, resistive against hydrolysis in hot water, superior in mechanical strength and impact resistance, and thereby capable of withstanding deformation due to water pressure or water hammer phenomenon In order to achieve the aforementioned object, the present invention provides a pipe joint for connecting pipes through which hot water, antifreeze, liquid heat medium or vapor passes, comprising: a main body; and a connector for connecting the main body to a pipe; wherein at least either the main body or connector is formed from one type selected from a group consisting of resin it which thermoplastic elastomer is added to polyphenylene sulfide, polysulfone, polyphenyl sulfone, polyphthalimide and polyetherimide, and the main body and connector are formed integrally.

In other words, by forming at least either the main body or connector from one type selected from a group consisting of resin in which thermoplastic elastomer is added to polyphenylene sulfide, polysulfone, polyphenyl sulfone, polyphthalimide and polyetherimide, which are superior in chemical resistance and impact resistance at high temperatures, provided is a pipe joint which is superior in workability, inexpensive and light, superior in resistance against chlorine and oxygen contained in hot water or vapor, resistive against hydrolysis in hot water, superior in mechanical strength and impact resistance, and thereby capable of withstanding deformation due to water pressure or water hammer phenomenon.

Moreover, by integrally forming the main body and connector, the manufacturing process of brazing etc. required with conventional metal pipe joints will no longer he necessary. In addition, this integral structure can also prevent water leakage from the brazed portion and, particularly, there will be no contact between the metal and resin, The pipe joint according to this invention may also be structured by forming at least either the main body or connector from resin in which at least one type among glass fiber, mineral or thermoplastic elastomer is added to a type selected from a group consisting of polysulfone, polyphenyl sulfone, polyphthalimide and polyetherimide, and the main body and connector are formed integrally.

The pipe joint according to this invention may also be structured by forming at least either the main body or connector of resin in which at least one type among glass fiber or mineral is added to resin in which thermoplastic elastomer is added to polyphenylene sulfide, and the main body and connector are formed integrally.

In other words, by adding glass fiber, mineral or thermoplastic elastomer, which are superior in impact resistance, to a type selected from a group consisting of polysulfone, polyphenyl sulfone, polyphthalimide and polyetherimide, which are superior in chemical resistance and impact resistance at high temperatures, obtained is resin extremely superior in chemical resistance and impact resistance. Therefore, the pipe joint in which at least either the main body or connector is formed from this resin will be superior in workability, inexpensive and light, superior in resistance against chlorine and oxygen contained in hot water or vapor, resistive against hydrolysis in hot water, superior in mechanical strength and impact resistance, and thereby capable of withstanding deformation due to water pressure or water hammer phenomenon.

The pipe joint according to this invention may also be structured by forming at least either the main body or connector of resin in which at least one type among glass fiber or mineral is added to resin in which thermoplastic elastomer is added to polyphenylene sulfide, and the main body and connector are formed integrally.

According to this structure, the pipe joint will be superior in workability, inexpensive and light, superior in resistance against chlorine and oxygen contained in hot water or vapor, resistive against hydrolysis in hot water, superior in mechanical strength and impact resistance, and thereby capable of withstanding deformation due to water pressure or water hammer phenomenon.

The thermoplastic elastomer nay be added to polyphenylene sulfide at a ratio of more than 5% and less than 20%. If the additive ratio of the thermoplastic elastomer to polyphenylene sulfide is less than 5%, there tends to be difficulty in obtaining superior impact resistance. Contrarily, if the additive ratio of the thermoplastic elastomer to polyphenylene sulfide is more than 20%, there tends to be difficulty in obtaining superior chemical resistance. The natural mechanical strength of polyphenylene sulfide may also be lost.

Glass fiber or mineral may be added to one type among polysulfone, polyphenyl sulfone, polyphthalimide and polyetherimide at a ratio of more than 5% and less than 50%. If the additive ratio of glass fiber or mineral to polysulfone, polyphenyl sulfone, polyphthalimide or polyetherimide is less than 5%, there tends to be difficulty in obtaining superior impact resistance. Contrarily, if the additive ratio of glass fiber or mineral to polysulfone, polyphenyl sulfone, polyphthalimide or polyetherimide is more than 50%, there tends to be difficulty in obtaining superior chemical resistance. The natural mechanical strength of polysulfone, polyphenyl sulfone, polyphthalimide or polyetherimide may also be lost.

Glass fiber or mineral may also be added to resin in which thermoplastic elastomer is added to polyphenylene sulfide at a ratio of more than 5% and less than 50% If the additive ratio of glass fiber or mineral to resin in which thermoplastic elastomer is added to polyphenylene sulfide is less than 5%, there tends to be difficulty in obtaining superior impact resistance. Contrarily, if the additive ratio of glass fiber or mineral to resin in which thermoplastic elastomer is added to polyphenylene sulfide is more than 50%, there tends to be difficulty in obtaining superior chemical resistance.

Thermoplastic elastomer may also be added to one type among polysulfone, polyphenyl sulfone, polyphthalimide and polyetherimide at a ratio of more than 5% and less than 20%. If the additive ratio of thermoplastic elastomer to one type among polysulfone, polyphenyl sulfone, polyphthalimide or polyetherimide is less than 5%, there tends to be difficulty in obtaining superior impact resistance. Contrarily, if the additive ratio of thermoplastic elastomer to one type among polysulfone, polyphenyl sulfone, polyphthalimide or polyetherimide is less than 20%, there tends to be difficulty in obtaining superior chemical resistance. The natural mechanical strength of polysulfone, polyphenyl sulfone, polyphthalimide or polyetherimide may also be lost.

Further, an engaging member for detachably engaging with a step member formed on the pipe may be provided to the main body. this engaging member and main body may be formed integrally.

According to this structure, the pipe joint can be securely fastened to the pipe one-handedly, and the work efficiency is improved. Moreover, separate components for fastening the pipe joint and main body will not be required.

Further, a step member for detachably engaging with an engaging member formed an the pipe may also be provided to the main body.

The step member may be a flange formed at the end of the main body, and the flange and main body may be formed integrally.

The engaging member may comprise an engagement pawl at the tip thereof for engaging with the step member, and may have a structure wherein the engagement pawl elastically retreats in the direction away from the step member upon passing the step member, whereby the engagement pawl is restored after passing the step member.

An engagement release member for releasing the engagement of the engagement pawl and step member may be provided to the base end of the engaging member.

Further, a flange for determining the connective position of the pipe may be integrally formed on the main body.

DESCRIPTION OF THE PREFERRED EMBODIMENTS

A pipe joint according to the embodiments of the present invention is now explained with reference to the drawings.

Embodiment 1

Figure 1:
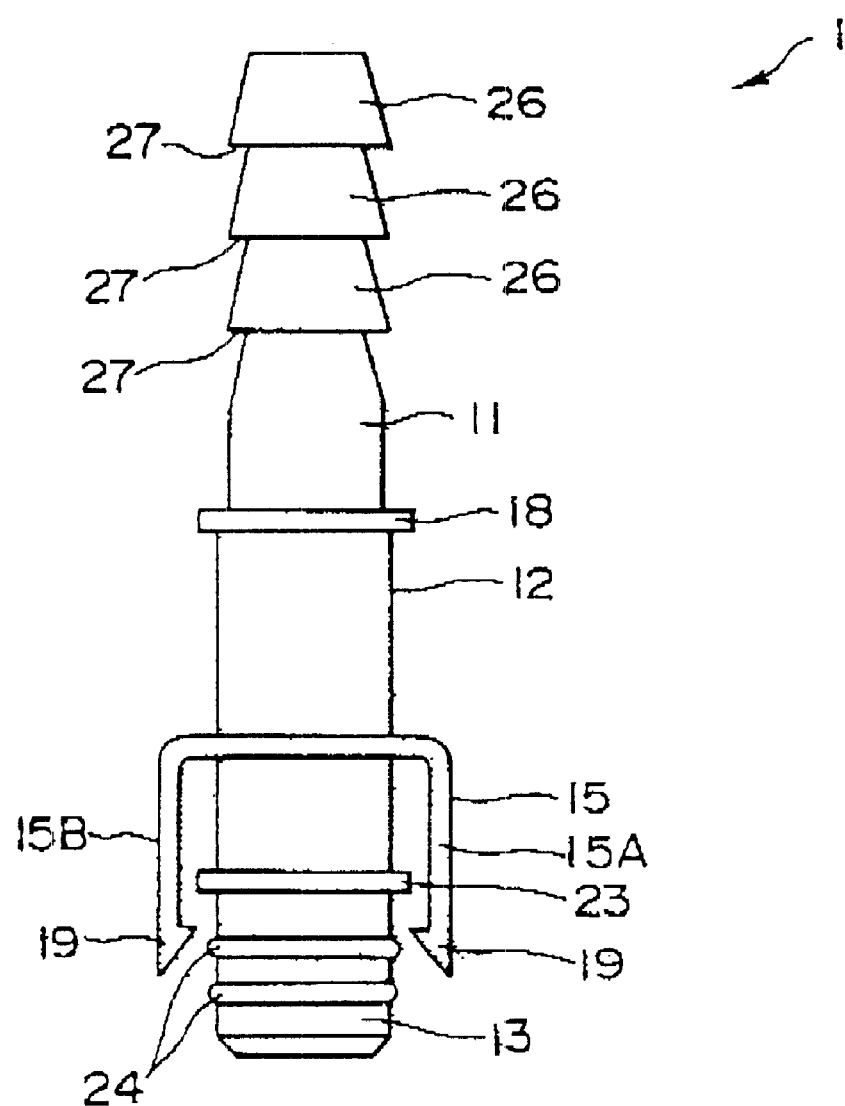
FIG. 1 is a front view of the pipe joint according to Embodiment 1 of the present invention.
Figure 2:
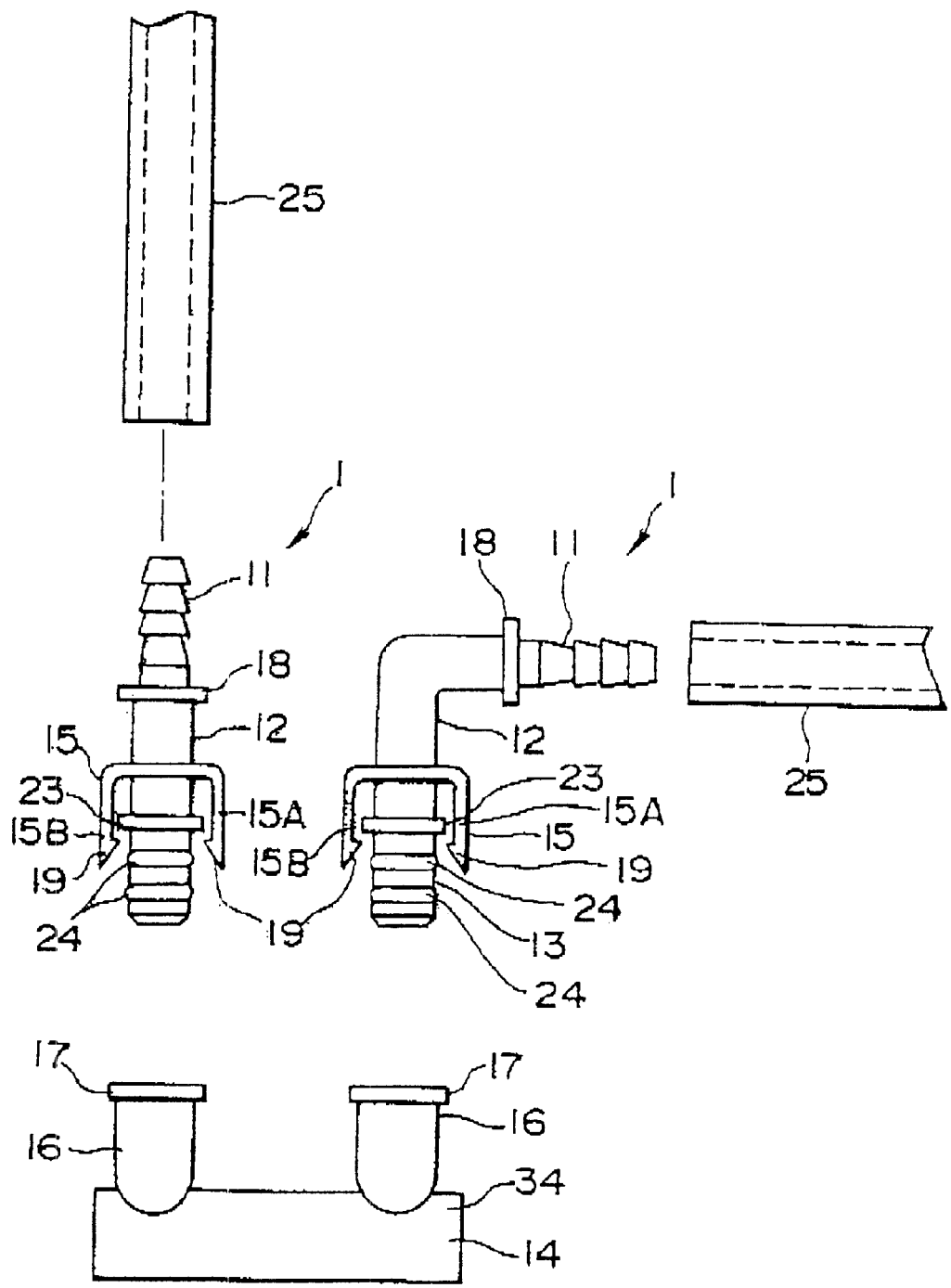
FIG. 2 is a front view showing the state of connecting the pipe tube to the header with the pipe joint shown in FIG. 1.
Figure 3:
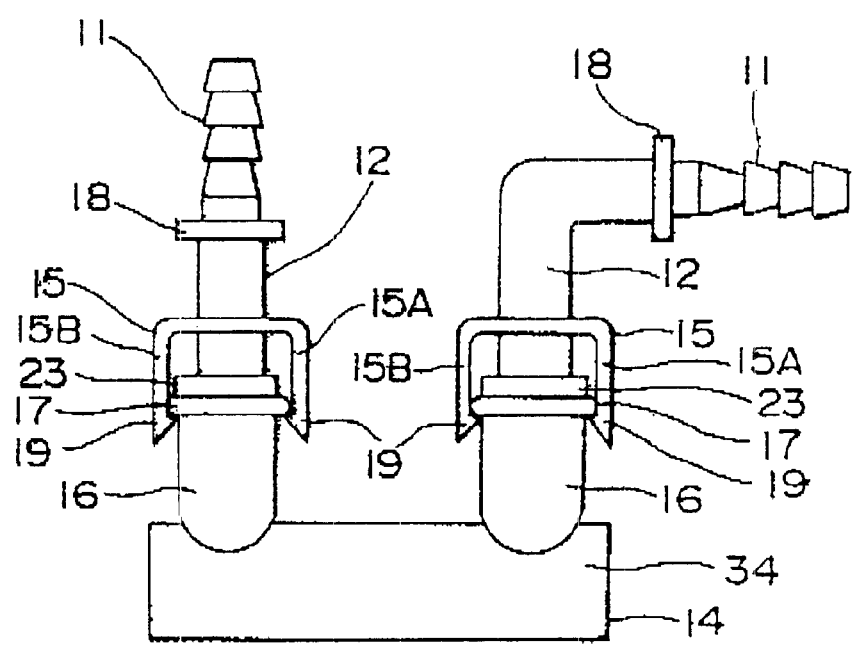
FIG. 3 is a front view showing the state of connecting the pipe tube to the header with the pipe joint shown in FIG. 1.

FIG. 1 is a front view of the pipe joint according to Embodiment 1. FIG. 2 is front view showing the state of connecting the pipe tube to the header with the pipe joint shown in FIG. 1. FIG. 3 is a front view showing the state of connecting the pipe tube to the header with the pipe joint shown in FIG. 1. Embodiment 1 explains the case where a header 14, which is a pipe assembly joint, is connected to a pipe tube 25 with a pipe joint 1 of this embodiment.

As shown in FIGS. 1~3, the pipe joint 1 of Embodiment 1 is structured by comprising a main body 12, tube-side connector 11 formed on one end of the main body 12 to be connected to the pipe tube 25, header-side connector 13 formed on the other end of the main body 12 to be connected to the header 14, and engaging member 15 for engaging with a flange 17 formed on the header 14.

The main body 12, tube-side connector 11, header-side connector 13 and engaging member 15 of this pipe joint 1 are formed integrally by injection molding resin in which thermoplastic elastomer is added to polyphenylene sulfide. Specifically, in Embodiment 1, polyester elastomer is used as the thermoplastic elastomer, and this is added to polyphenylene sulfide at an additive ratio of 10% in order to obtain the resin used.

That is, this resin is obtained by adding thermoplastic elastomer, which is superior in impact resistance, to polyphenylene sulfide, which is superior in chemical resistance at high temperatures. The resin therefore possesses both characteristics of chemical resistance and impact resistance. As a result, the pipe joint 1 formed with this resin will be superior in workability, inexpensive and light, superior in resistance against chlorine and oxygen contained in hot water or vapor, resistive against hydrolysis in hot water, superior in mechanical strength and impact resistance, and thereby capable of withstanding deformation due to water pressure or water hammer phenomenon.

The main body 12 is formed from a hollow cylindrical shape, and flanges 18, 23 are integrally formed on both ends. The flange 18 may be used for determining the position of and securing the dedicated jig used for connecting the pipe tube 25. Further, the flange 18 fulfills the duty of determining the position of the pipe tube 25. This flange 18 may be easily provided by integrally forming such flange with the main body 12 upon injection molding resin. Moreover, since separate components such as E rings or C rings are not required as in the past, the number of components and the manufacturing cost may be reduced. The main body 12, as shown in FIGS. 2 and 3, may also be in an L shape.

The tube-side connector 11 is formed from a hollow cylindrical shape, and comprises three continuous shapes 26 forming the tip thereof. The diameter of these shapes 26 gradually becomes larger from the tip side (side far from the main body 12) to the base-end side. Stoppers 27 in a step shape are formed with these shapes 26, and prevent the disconnection of the pipe tube 25 connected to the tube-side connector 11.

The header-side connector 13 is formed from a hollow cylindrical shape, and comprises two O rings 24 on the periphery thereof. Upon the header-side connector 13 being housed in the housing 16 of the header 14 explained later, these O rings 24 hermetically seal the inner wall of the housing 16 and the outer wall of the header-side connector 13.

The engaging member 15 has an approximate U shape when viewed from the front, and comprises arms 15A and 15B extending toward the header 14 roughly in parallel with the axial direction of the main body 12. A hook-shaped engagement pawl 19 is formed at both ends of these arms 15A and 15B. This engagement pawl 19 detachably engages with the flange 17 of the header 14 described later, and connects and secures the header 14 to the pipe joint 1. When the header-side connector 13 is inserted into the insertion 16 of the header 14, and when the engagement pawl 19 elastically retreats in a direction away from the flange 17 with the joint of the arms 1SA and 158 as the fulcrum upon the engagement pawl 19 passing the flange 17, the engaging member 15 is restored to the original state and engages with the flange 17.

Here, the pipe joint 1 is movably connected to the header 14.

This engaging member 15 enables the pipe joint 1 to be accurately fixed to the header 14 single-handedly, thereby improving the work efficiency. Further, in order to secure the pipe joint 1 and header 14, for example, it is not necessary to use a separate component such as a fastening clip, etc. Therefore, the number of components and the manufacturing cost may be reduced. Moreover, as the engaging member 15 is integrally formed with the main body 12, there is no concern of losing the component upon using the same as in the past.

As the main body 12, tube-side connector 11, header-side connector 13 and engaging member 15 of the pipe joint 1 according to Embodiment 1 are formed integrally, water leakage will not occur from the joints of the respective members.

The header 14, as shown in FIGS. 2 and 3, comprises a main pipe 34, and housings 16, which are branched off from such main pipe 34, for housing the header-side connector 13 of the pipe joint 1. A flange 17 for engaging with the engagement pawl 19 of the pipe joint 1 is provided at the tip of these housings 16. This header 14 may be formed from resin as in the pipe joint 1 or from metal as conventionally.

Although polyester elastomer was used as the thermoplastic elastomer in Embodiment 1, it is not limited thereto, and used may be olefin elastomer, polyamide elastomer, polystyrene elastomer, polyurethane elastomer, and so on.

Furthermore, although the additive ratio of thermoplastic elastomer to polyphenylene sulfide is 10% in Embodiment 1, it is not limited thereto, and such additive amount may be suitably set to be within a range of more than 5% and less than 20%. In Embodiment 1, explained was the case where the main body 12, tube-side connector 11, header-side connector 13 and engaging member 15 of this pipe joint 1 are formed integrally by injection molding resin in which thermoplastic elastomer is added to polyphenylene sulfide. Nevertheless, it is not limited thereto, and such members may also be formed from polysulfone, polyphenyl sulfone, polyphthalimide and polyetherimide. It is also possible to form such members from resin in which at least one type among glass fiber, mineral or thermoplastic elastomer is added to a type selected from a group consisting of polysulfone, polyphernyl sulfone, polyphthalimide and polyetherimide. Here, it is preferable that glass fiber or mineral is added to one type among polysulfone, polyphenyl sulfone, polyphthalimide and polyetherimide at a ratio of more than 5% and less than 50%. Further, it is preferable that thermoplastic elastomer is added to one type among polysulfone, polyphenyl sulfone, polyphthalimide and polyetherimide at a ratio of more than 5% and less than 20%. It is also possible to form such members from resin in which two arbitrary types among glass fiber, mineral and thermoplastic elastomer are added to a type selected from a group consisting of polysulfone, polyphenyl sulfone, polyphthalimide and polyetherimide. Glass fiber or mineral may also be added to resin, in which thermoplastic elastomer is added to polyphenylene sulfide, at a ratio of more than 5% and less than 50%.

Moreover, although Embodiment 1 describes a pipe joint 1 connecting a header 14 and pipe tube 25, it is not limited thereto, and the pipe joint according to the present invention may be used to connect pipes; for example, two pipe tubes, or may be used to connect two headers.

Further, although Embodiment 1 describes a case wherein the pipe joint 1 is movably connected to the header 14, it is not limited thereto. For example, it would also be possible to form a notch on the flange 17 of the header 14 for position setting, and an engaging member for engaging with this notch on the flange 23 of the pipe joint 1. By engaging this engaging member and notch, it is possible to connect the pipe joint 1 to header 14 with the pipe joint 1 in a fixed state.

Embodiment 2

Embodiment 2 according to the present invention is now explained with reference to the drawings. Members of this embodiment which are the same as Embodiment 1 are given the same reference numeral and the detailed explanation thereof is omitted. The pipe joint of Embodiment 2 may also be formed utilizing the same materials described in Embodiment 1.

Figure 4:
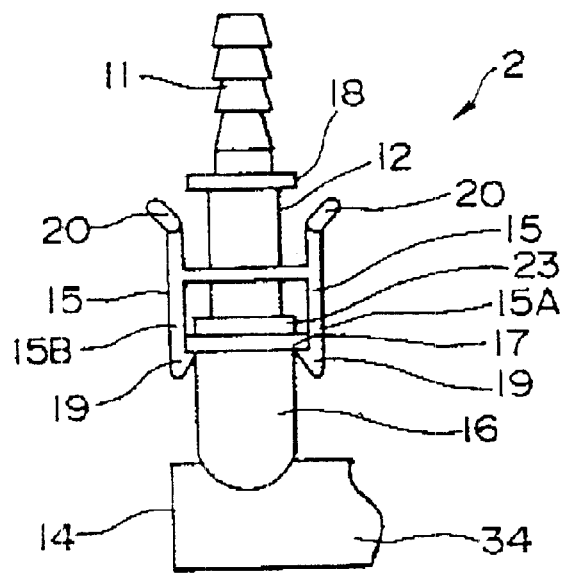
FIG. 4 is a front view showing the state of connecting the pipe joint of Embodiment 2 of this invention to the header.

FIG. 4 is a front view showing the state of connecting the pipe joint of the present embodiment to the header.

As shown in FIG. 4, the difference between the pipe joint 2 of this embodiment and the pipe joint 1 of Embodiment 1 is that an engagement release lever 20 is provided for enabling the engaging member 15 to release the engagement between the engagement pawl 19 and the flange 17.

The engagement release lever 20 extends from the respective joints of the arms 15A and 15B of the engaging member 15 to the opposite side of the engagement pawl 19. The end on the side away from the engagement pawl of this engagement release lever 20 has an approximate J shape extending externally. The arms 15A and 15B and the engagement release lever 20 are formed integrally. By pushing the engagement release lever 20 comprising this structure toward the inside (toward the main body 12), the arms 15A and 15B are elastically spread toward the outside with the respective joints thereof being the fulcrum. Therefore, it is possible to easily release the engagement between the engagement pawl 19 and the flange 17.

Although Embodiment 2 describes a case providing an approximate J-shaped engagement release lever 20, it is not limited thereto, and may be any other shape so as long as the engagement between the engagement pawl 19 and the flange 17 can be easily released. For example, the engagement release lever according to the present invention may have an I shape extending on the extension line of the arms 15A and 15B, or, an approximate L shape extending roughly perpendicular in the axial direction of the main body 12.

Embodiment 3

Embodiment 3 according to the present invention is now explained with reference to the drawings. Members of this embodiment which are the same as Embodiment 1 are given the same reference numeral and the detailed explanation thereof is omitted. The pipe joint of Embodiment 3 may also be formed utilizing the same materials described in Embodiment 1.

Figure 5:
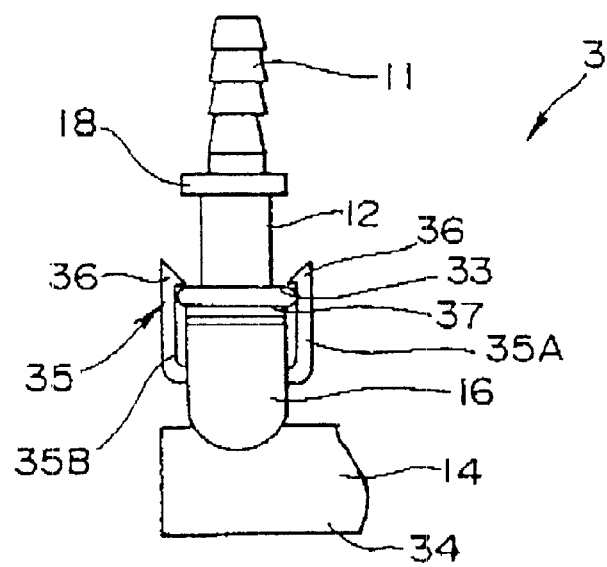
FIG. 5 is a front view showing the state of connecting the pipe joint of Embodiment 3 off this invention to the header.

FIG. 5 is a front view showing the state of connecting the pipe joint of Embodiment 3 to the header.

As shown in FIG. 5, the difference between the pipe joint 3 and header 14 of this embodiment and the pipe joint 1 and header 14 of Embodiment 1 is in the size of the flange 33 formed on the header 14 side of the main body 12, size of the flange 37 formed on the header 14, and an engaging member 35, which has similar functions as the engaging member 15 being provided to the header 14 instead of mounting the engaging member 15 on the main body 12, That is, as clear from FIG. 5, a flange 33, which is slightly larger than the flange 23 described in Embodiment 1, is formed on the end of the header 14 side of the main body 12 of the pipe joint 3 of this embodiment. This flange 33 engages with the engagement pawl 36 of the engaging member 35 described later.

At the tip of the housing 16 of the header 14, a flange 37 having a diameter slightly smaller than the flange 17 described in Embodiment 1 is formed. The diameter of this flange 37 is formed to be slightly smaller than the diameter of the flange 33. Further, an engaging member 35 is integrally formed at the approximate center of the housing 16 in the axial direction thereof. In Embodiment 3, the header 14 is formed integrally together with the engaging member 35 with the resin used for forming the pipe joint 1 in Embodiment 1.

The engaging member 35 comprises arms 35A and 35B extending toward the pipe joint 3 side in parallel to the axial direction of the housing 16. A hook-shaped engagement pawl 36 is formed at the tip of these arms 35A and 35S. The engagement pawl 36 detachably engages with the flange 33 of the pipe joint 3, and connects and secures the header 14 to the pipe joint 3. When the header-side connector 13 is inserted into the insertion 16 of the header 14, and when the engagement pawl 36 elastically retreats in a direction away from the flange 37 with the joint of the arms 35A and 35B as the fulcrum upon the engagement pawl 36 passing the flange 37, the engaging member 35 is restored to the original state and engages with the flange 37.

Here, as the flange 37 of the housing 16 is formed slightly smaller than the diameter of the flange 33, it will not be a hindrance when the engagement pawl 36 engages with the flange 33.

Moreover, an engagement release lever as described in Embodiment 2 may also be integrally formed with this engaging member 35, Although the flange 37 is formed slightly smaller than the diameter of the flange 33 in Embodiment 3, it is not limited thereto, and the flange 37 may be formed to be the same size as the diameter of the flange 33.

Embodiment 4

Embodiment 4 according to the present invention is now explained with reference to the drawings. Members of this embodiment which are the same as Embodiment 1 are given the same reference numeral and the detailed explanation thereof is omitted. The pipe joint of Embodiment 4 may also be formed utilizing the same materials described in Embodiment 1.

Figure 6:
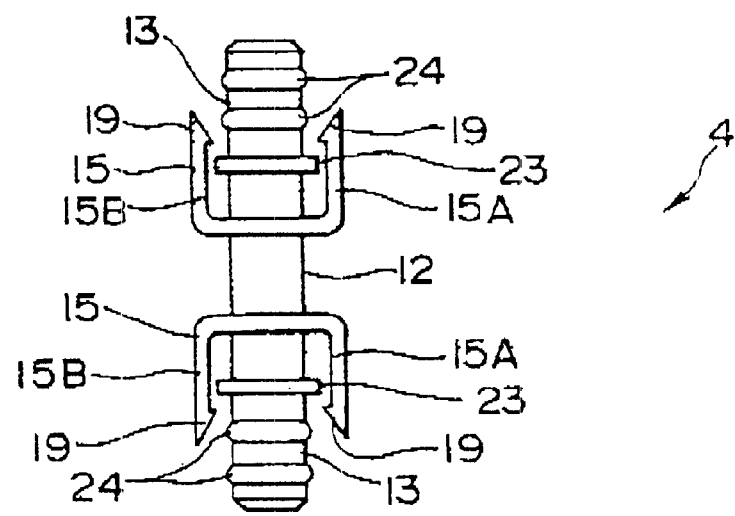
FIG. 6 is a front view of the pipe joint of Embodiment 2 of this invention.

FIG. 6 is a front view of the pipe joint according to Embodiment 4.

As shown in FIG. 6, the difference between the pipe joint of this embodiment and the pipe joint 1 of Embodiment 1 is that an engaging member 15 and flange 23 are integrally formed at both ends of the main body 12, and that a header-side connector 13 is integrally formed at both ends of the main body 12. In other words, this pipe joint 4 is formed by the header-side connector 13 side being symmetrically structured against the perpendicular line in the axial direction at the approximate center of the pipe joint 1 of Embodiment 1.

With this pipe joint 4, headers 14 may be connected to both ends, or pipe tubes (with a flange 17 formed at the end thereof) having a shape wherein the housing of the header 14 is extended may be connected. Further, one end may be connected to the header 14 and the other end may be connected to the pipe tube.

Embodiment 5

Embodiment 5 according to the present invention is now explained with reference to the drawings. Members of this embodiment which are the same as Embodiment 1 are given the same reference numeral and the detailed explanation thereof is omitted. The pipe joint of Embodiment 5 may also be formed utilizing the same materials described in Embodiment 1.

Figure 7:
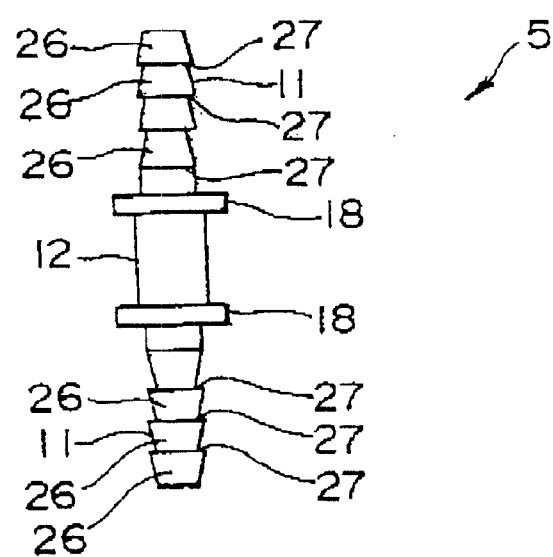
FIG. 7 is a front view of the pipe joint of Embodiment 5 of this invention.

FIG. 7 is a front view of the pipe joint according to Embodiment 5.

As shown in FIG. 7, the difference between the pipe joint 5 of this embodiment and the pipe joint 1 of Embodiment 1 is that a flange 18 is integrally formed at both ends of the main body 12, a tube-side connector 11 is integrally formed at both ends of the main body 12, and an engaging member 15 is provided. This pipe joint 5 is capable of connecting pipe tubes 25 at both ends thereof.

As described above, the present invention provides a pipe joint, comprising: a main body; and a connector for connecting the main body to a pipe; wherein at least either the main body or connector is formed from one type selected from a group consisting of resin in which thermoplastic elastomer is added to polyphenylene sulfide, polysulfone, polyphenyl sulfone, polyphthalimide and polyetherimide, and the main body and connector are formed integrally. Therefore, it is possible to provide a pipe joint which is superior in. Work ability, inexpensive and light, superior in resistance against chlorine and oxygen contained in hot water or vapor, resistive against hydrolysis in hot water, superior in mechanical strength and impact resistance, and thereby capable of withstanding deformation due to water pressure or water hammer phenomenon. Moreover, the manufacturing process of brazing etc. required with conventional metal pipe joints will no longer be necessary, and the productivity will improve. Further, as no water will leak from the brazed portion, a highly reliable pipe joint is provided.

Further, by providing to the main body an engaging member for detachably engaging with a step member formed on the pipe, the pipe joint can be securely fastened to the pipe one-handedly without requiring separate components for fastening the pipe joint and main body. Thus, the work efficiency is improved, the number of components is reduced, and problems such as losing the separate components will not arise.

In addition, by providing an engagement release member for releasing the engagement with the step member of the engaging member, the engagement between the pipe joint and pipe may be easily released.

Moreover, by providing to the main body a flange for determining the connective position of the pipe, it is possible to determine the position of and secure the dedicated jig used for connecting the pipes. As a result, it is not necessary to use separate components such an E ring or C ring conventionally utilized as the flange and the number of components and the manufacturing cost may be reduced.

What is claimed is:

1. A pipe joint for connecting pipes through which hot water, antifreeze, liquid heat medium or vapor passes, comprising:

a main body; and a connector for connecting said main body to a pipe; wherein at least either said main body or connector is formed from a resin which includes a thermoplastic elastomer mixed with a component selected from a group consisting of (1) polyphenylene sulfide, (2) polyphenyl sulfone, (3) polyphthalimide and (4) polyetherimide, and said main body and connector are formed integrally.

2. A pipe joint according to claim 1, wherein at least either said main body or connector is formed from resin in which at least one type among glass fiber, mineral or thermoplastic elastomer is added to a type selected from a group consisting of said polysulfone, polyphenyl sulfone, polyphthalimide and polyetherimide, and said main body and connector are formed integrally.

3. A pipe joint according to claim 2, wherein glass fiber or mineral is added to one type among said polysulfone, polyphenyl sulfone, polyphthalimide and polyetherimide at a ratio of more than 5% and less than 50%.

4. A pipe joint according to claim 2, wherein thermoplastic elastomer is added to one type among said polysulfone, polyphenyl sulfone, polyphthalimide and polyetherimide at a ratio of more than 5% and less than 20%.

5. A pipe joint according to claim 1, wherein at least either said main body or connector is formed of resin in which at least one type among glass fiber or mineral is added to resin in which thermoplastic elastomer is added to polyphenylene sulfide, and said main body and connector are formed integrally.

6. A pipe joint according to claim 3, wherein glass fiber or mineral is added to resin in which thermoplastic elastomer is added to polyphenylene sulfide at a ratio of more than 5% and less than 50%.

7. A pipe joint according to claim 1, wherein said thermoplastic elastomer is added to said polyphenylene sulfide at a ratio of more than 5% and less than 20%.

8. A pipe joint according to claim 1, wherein an engaging member for detachably engaging with a step member formed on said pipe is provided to said main body.

9. A pipe joint according to claim 8, wherein said engaging member and said main body are formed integrally.

10. A pipe joint according to claim 8, wherein said engaging member comprises an engagement pawl at the tip thereof for engaging with said step member, and said engagement pawl elastically retreats in the direction away from said step member upon passing said step member, and said engagement pawl is restored after passing said step member.

11. A pipe joint according to claim 10, wherein an engagement release member for releasing the engagement of said engagement pawl and said step member is provided to the base end of said engaging member.

12. A pipe joint according to claim 1, wherein a step member for detachably engaging with an engaging member formed on said pipe is provided to said main body.

13. A pipe joint according to claims 12, wherein said step member is a flange formed at the end of said a main body, and said flange and said main body are formed integrally.

14. A pipe joint according to claim 1, wherein a flange for determining the connective position of said pipe is integrally formed on said main body.

* * * * *